Figure 1:
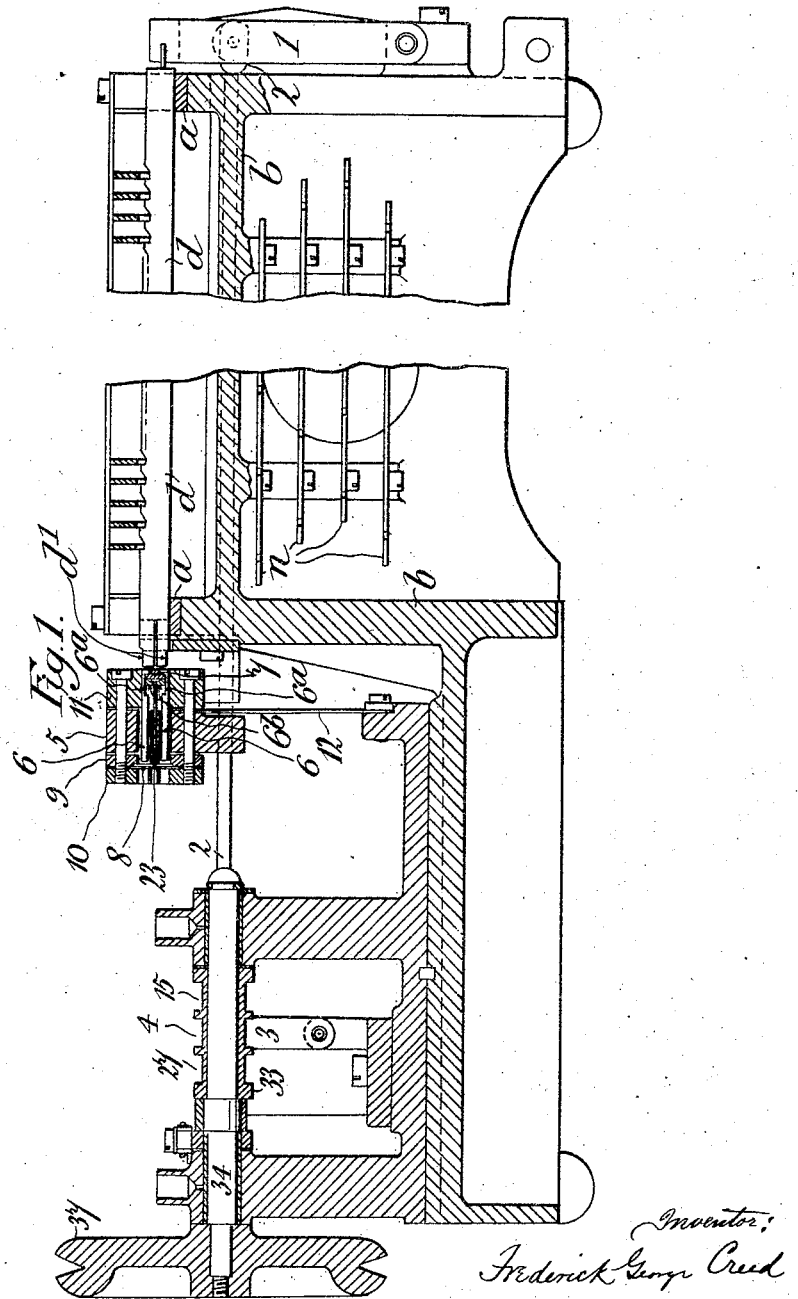

March 30, 1926.

F. G. CREED
KEYBOARD PERFORATOR 1,579,087

Filed June 27, 1922    8 Sheets-Sheet 4

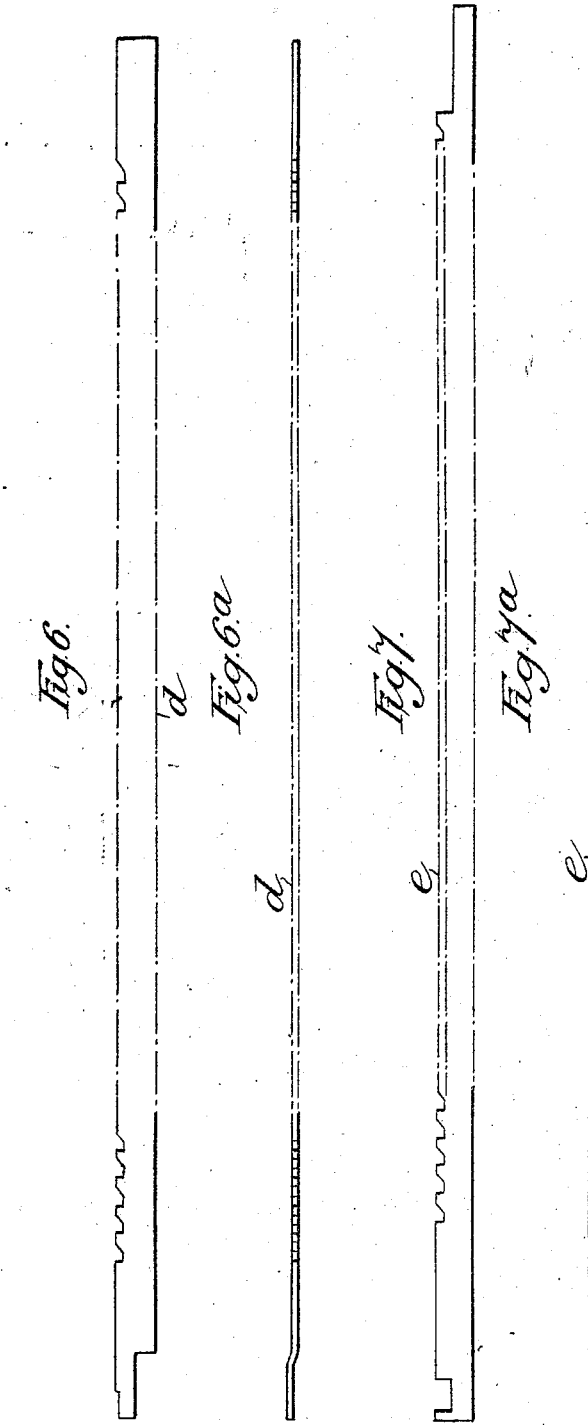

March 30, 1926.
F. G. CREED
KEYBOARD PERFORATOR
Filed June 27, 1922
1,579,087
8 Sheets-Sheet 6
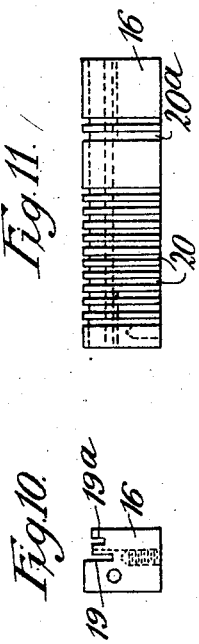
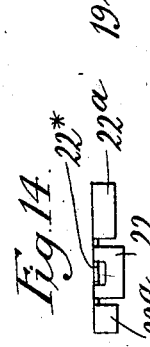

March 30, 1926. 1,579,087
F. G. CREED
KEYBOARD PERFORATOR
Filed June 27, 1922   8 Sheets-Sheet 7
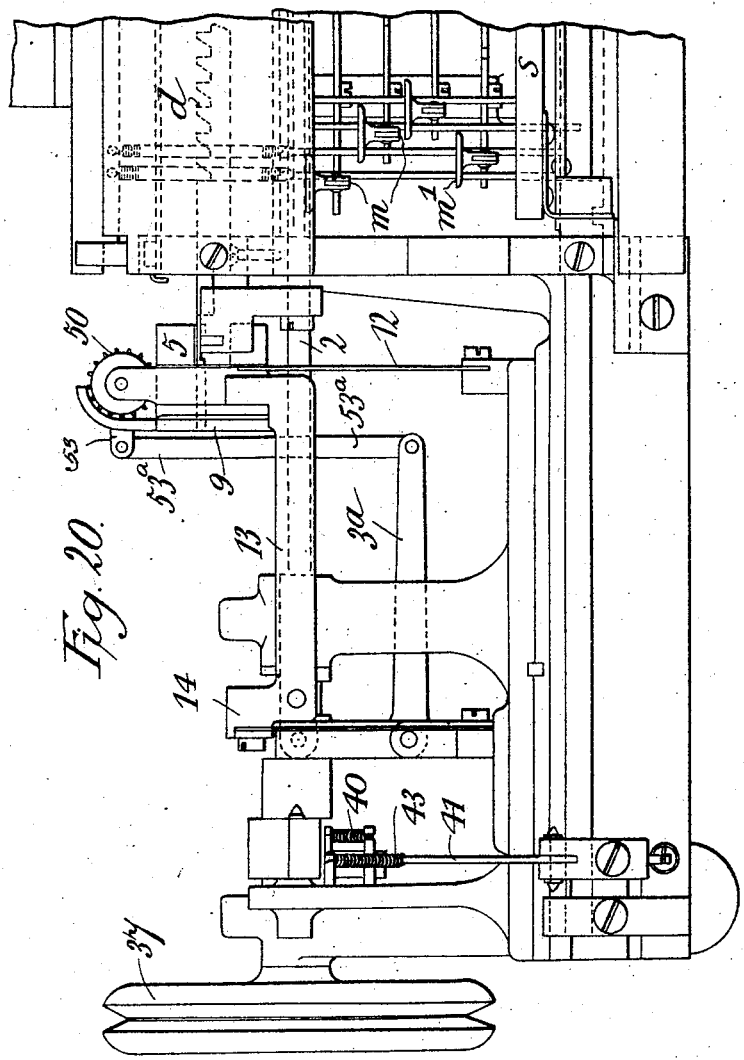

March 30, 1926.
F. G. CREED
KEYBOARD PERFORATOR
Filed June 27, 1922
1,579,087
8 Sheets-Sheet 8
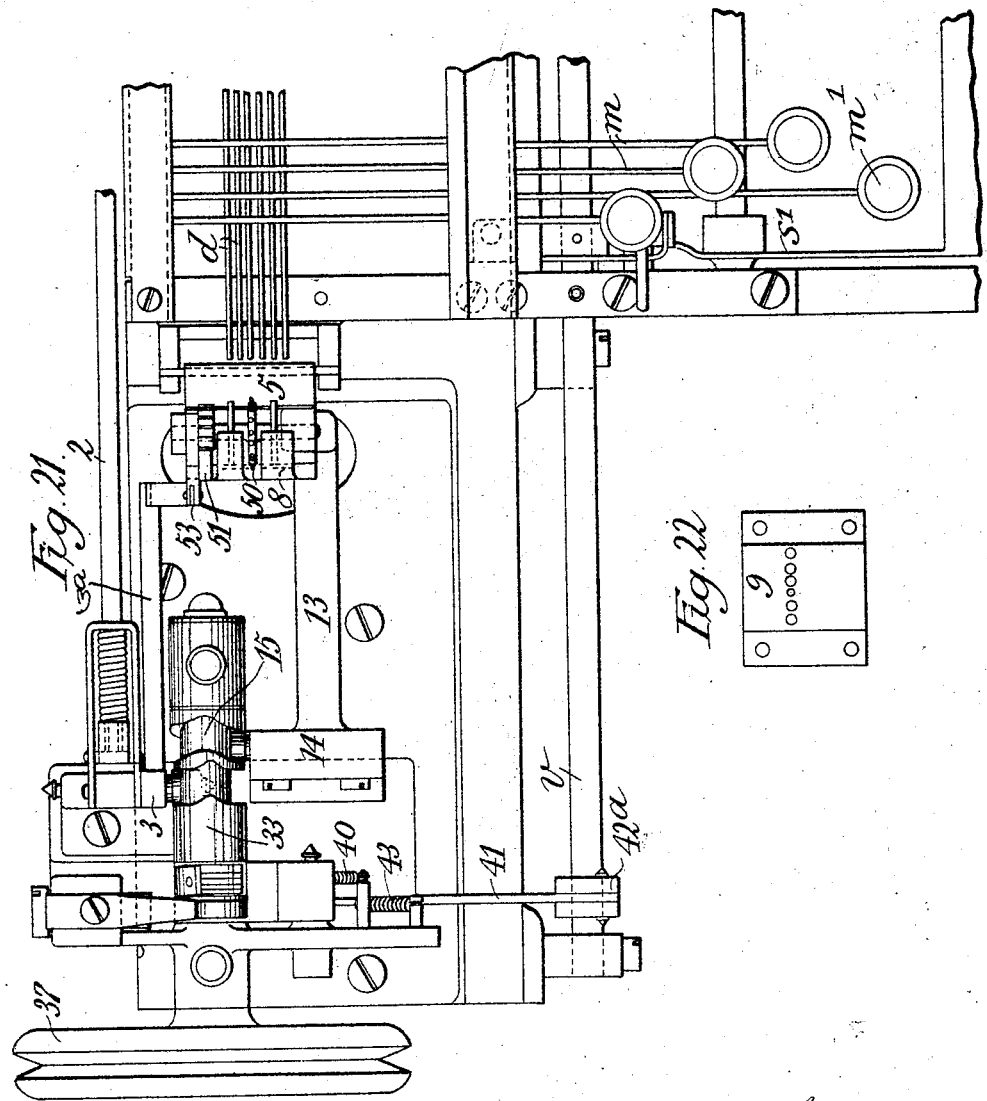

Patented Mar. 30, 1926.

1,579,087

UNITED STATES PATENT OFFICE.

FREDERICK GEORGE CREED, OF CROYDON, ENGLAND.

KEYBOARD PERFORATOR.

Application filed June 27, 1922. Serial No. 571,261.

*To all whom it may concern:*

Be it known that I, FREDERICK GEORGE CREED, a subject of the King of Great Britain and Ireland, residing at Croydon, in the county of Surrey, England, have invented Improvements in Keyboard Perforators, of which the following is a specification.

This invention has reference to improvements in keyboard perforators suitable for producing punched tape for use in automatic telegraphy and it has for its object to simplify and cheapen the construction and improve the working of such perforators and also to avoid any need of adjustment of parts thereof after the perforator has been once made and set for use.

To this end, in a keyboard perforator according to the invention, the required perforations to represent a letter or other character (hereinafter included in the term letter) are made in a suitably guided tape by the aid of a die plate and punches carried by a punch block that is moved at the required times toward and from a series of specially notched combination bars that are properly set for each letter under the control of a resetting device and a corresponding key operated device, the tape, after each punching operation, being moved forward by a tape feeding device to a definite position so as to bring the succeeding portion of tape into position to be punched to represent a succeeding letter, or to form a space. When the letters to be punched in the tape are of variable length, as in the Wheatstone-Morse system of telegraphy, the tape feeding device may advantageously be in the form of a rake, hereinafter called the feed rake, which, during each punching operation, is disengaged from the tape and may be moved backward idly to an extent corresponding to the length of the letter being punched and the length of the double blank space at the end of the letter. This movement may conveniently be determined by one or other of a series of specially notched space or stop bars (hereinafter called space bars) that are under the control of springs and of the resetting device and corresponding key operated device, the feed rake being re-engaged with the punched tape when the same is released from the punches and moved forward to a definite fixed position so as to bring the succeeding portion of tape into position to be punched to represent a succeeding letter, or to form a space.

For producing punched tape according to the Wheatstone-Morse system, twenty notched combination bars, twenty punches with corresponding die plate and punch block, ten notched space bars and a tape feed device having a variable stroke will be required. For producing punched tape according to the five unit system, in which the punched letters are of equal length, five notched combination bars, five punches with corresponding die plate and punch block and a tape feeding device, which may be a rake, or a toothed wheel, having a constant stroke or extent of travel would be required, no space bars being in this case required.

The punch block, the resetting bar and the tape feeding device are operated at the required times, by means, conveniently cams, that are brought into operation at each operation of a key and are put out of operation automatically after the set of punching, feeding and bar resetting operations for producing each letter, or it may be for causing the tape to be moved forward a distance corresponding to the length of a space, without a punched letter, is complete. In each case only the combination bars are between the key operated bars or levers and the punches and only the space bars, when used, are between the key operated bars or levers and the tape feeding device, thereby effecting great simplicity of construction.

Keyboard perforators embodying the invention can be variously constructed.

Figure 2:
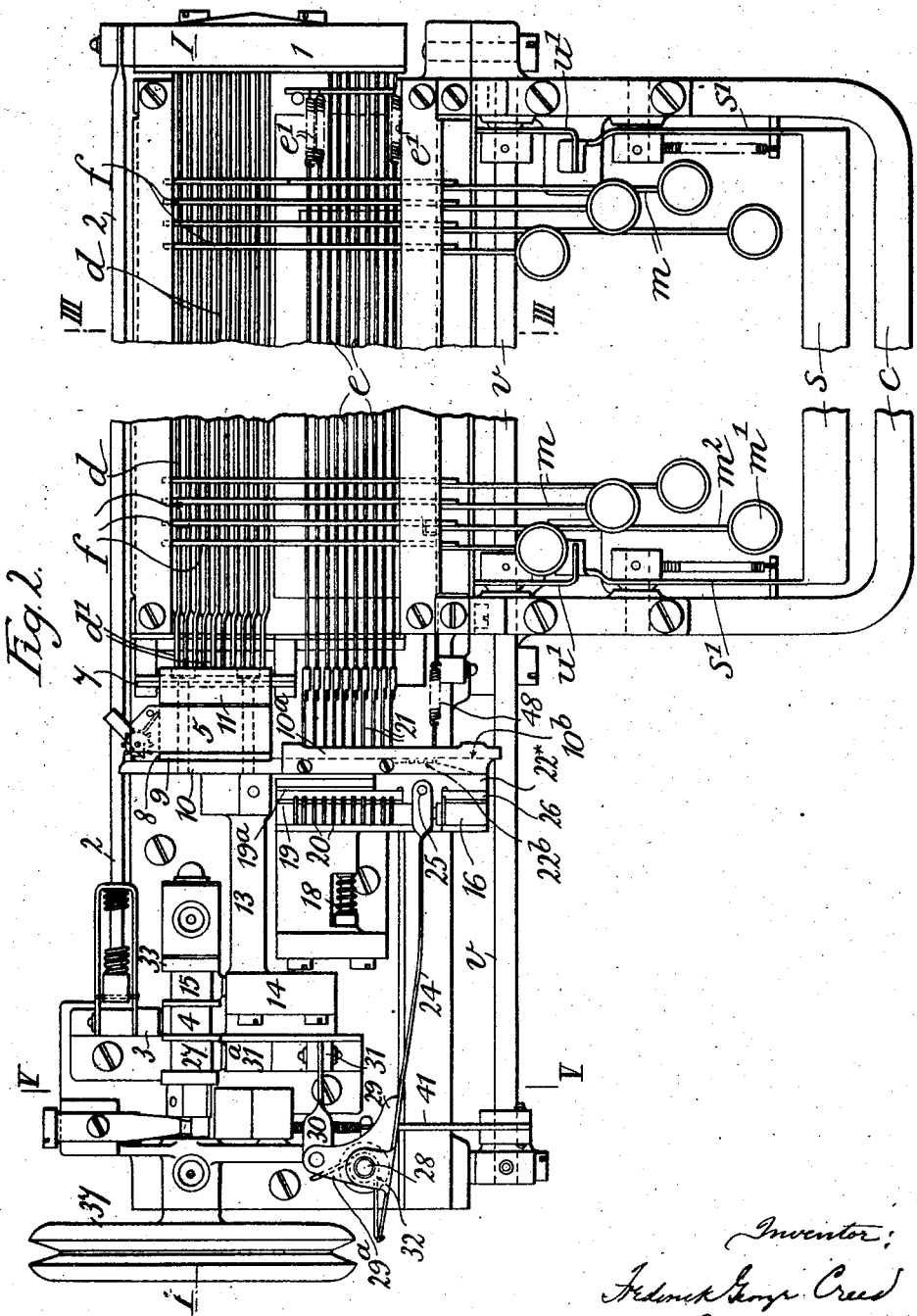
Figure 3:
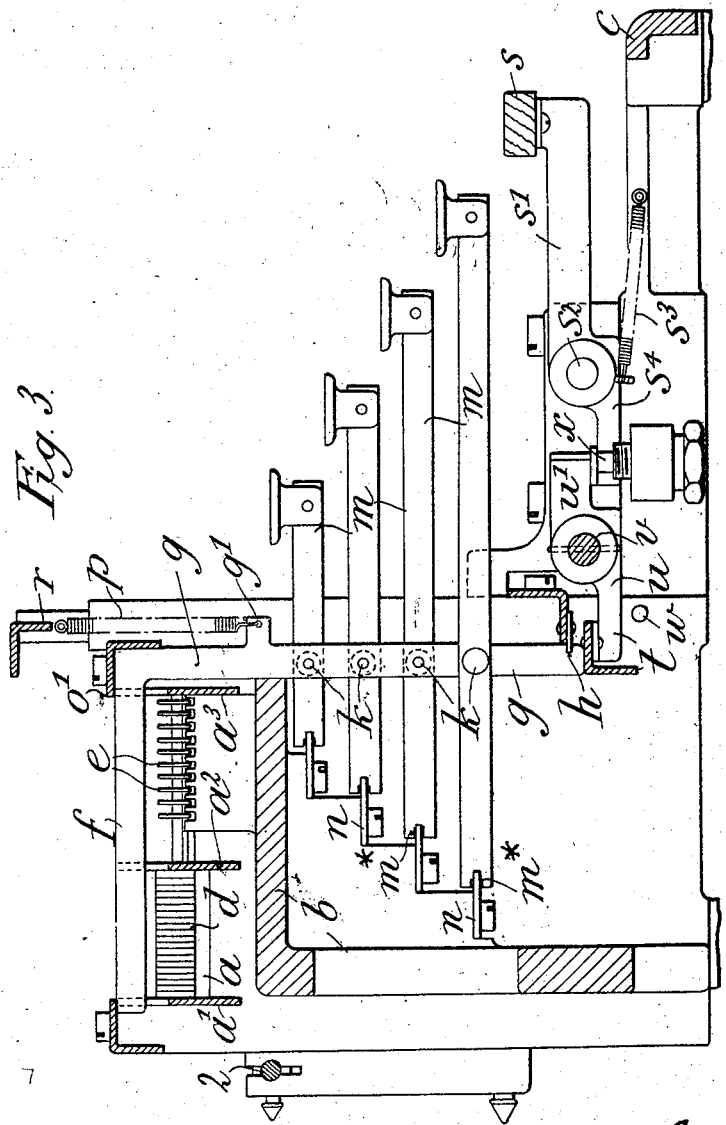
Figure 4:
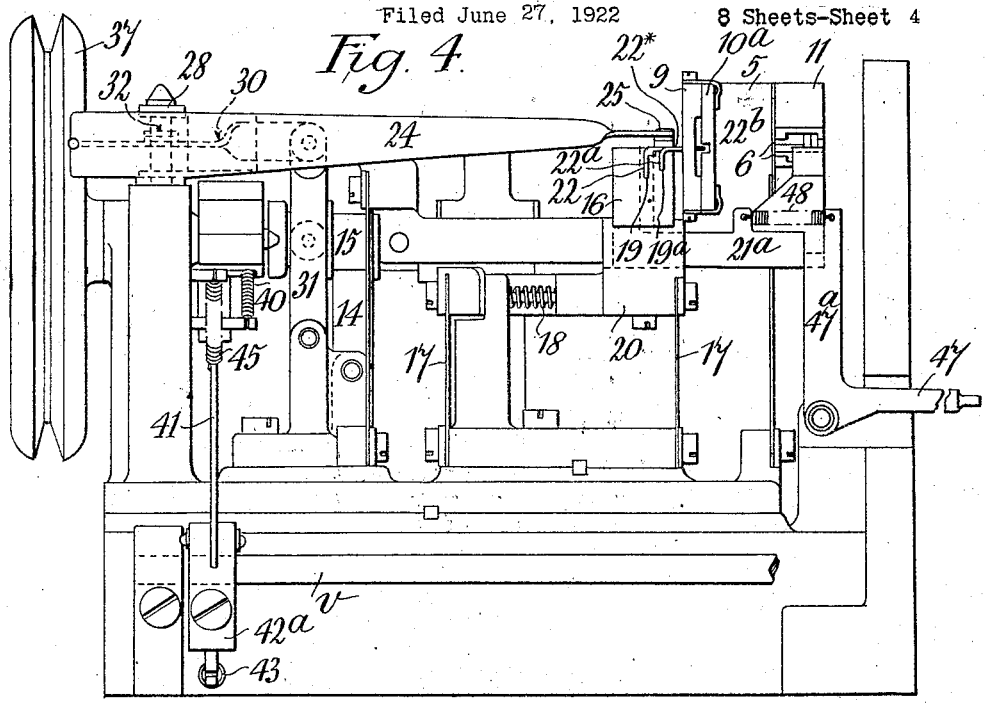
Figure 5:
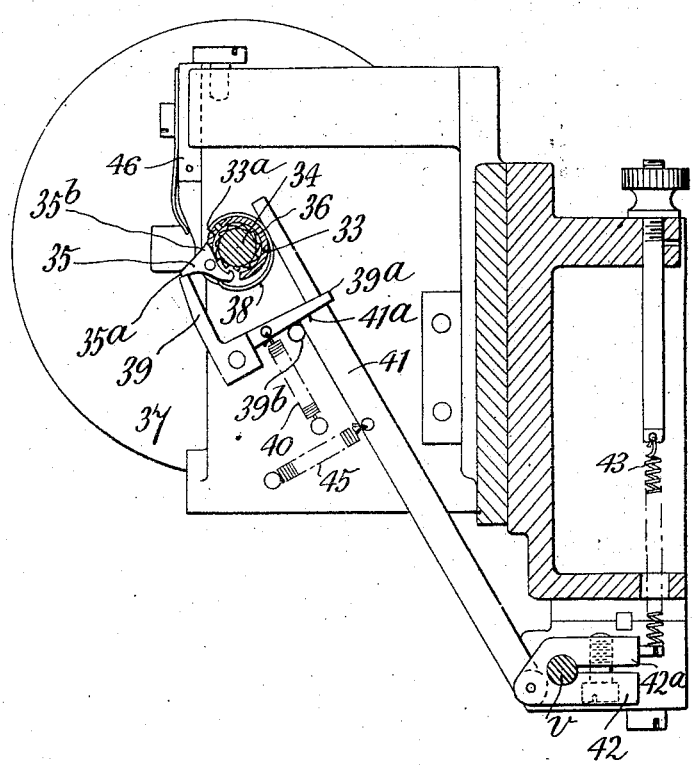

In the accompanying illustrative drawings, Fig. 1 is a longitudinal section on the line I—I of Fig. 2, Fig. 2 is a plan and Fig. 3 a cross section on the line III—III of Fig. 2, showing one construction of key-board perforator embodying the present invention, and suitable for producing Wheatstone-Morse punched tape. Fig. 4 is a side elevation showing the operating head of the perforator. Fig. 5 is a section on the line V—V of Fig. 2. Figs. 6 to 19 inclusive are detail views. Of these, Figs. 6 and 6ª are respectively a side elevation and plan of one of the combination bars, Figs. 7 and 7ª are respectively a side elevation and plan of a space bar and Fig. 7ᵇ a side elevation of a space stop. Fig. 8 is an end view of a punch block, Fig. 9 a view of two punches with punch withdrawing plate. Figs. 10, 11 and 12 are respectively an end view, side elevation and plan of a space stop bracket or rack and Figs. 13, 14 and 15 are respectively a front view, rear side view, and plan of a feed rake. Fig. 16 is a view of a piece of sheet metal from which the feed rake is made by bending it to the shape shown in Figs. 13, 14 and 15. Figs. 17, 18 and 19 show respectively in front elevation, in section on the line XVIII—XVIII of Fig. 17 and in end elevation, a cam and pawl.

Figs. 20 and 21 show respectively in front elevation and plan, part of the keyboard perforator adapted for producing five unit tapes and Fig. 22 is a detail view of one form of die plate that may be used in such modified form of keyboard perforator.

According to the construction shown in Figs. 1 to 19 respectively there are mounted, so as to slide endways on suitable supports $a$ and between guide bars $a^1$, $a^2$ (Fig. 3) carried by a frame $b$ and bed plate $c$, twenty notched combination bars $d$ and ten notched space bars $e$, the bars in each set being arranged parallel with one another and near together. Associated with the combination bars $d$ and space bars $e$ and arranged above and at right angles thereto, are key operated horizontal bars $f$ (hereinafter called horizontal key-bars) corresponding in number to the number of different letters which it is required that the perforator shall be capable of punching in a tape, say for instance forty-four. These key bars are separated from each other by and move vertically in fixed notched bars or racks two of which may be constituted by the guide bars $a^1$, $a^2$ and another by a separate bar $a^3$ (Fig. 3). The key bars are rigidly connected at one end, say the front end, to corresponding vertically movable member $g$ (hereinafter called vertical key bars) that are separated from each other and, at their lower ends, work in another and horizontal notched plate or rack $h$. The intermediate portion of each vertical key bar is connected by a pin $k$ to a finger key lever $m$ that is notched at its inner end at $m^*$ to admit of its being fulcrumed upon a plate support $n$ common to a number of such finger key levers. The several finger key levers are banked in the usual way as shown. Or they may alternatively be fixed to the horizontal key bars $f$. Each pair of horizontal and vertical key bars $f$ $g$ may conveniently be formed in one stamped plate of ⅂ shape.

Each pair of combined horizontal and vertical key-bars is normally supported in the raised position, against stationary horizontal stop plates $o$ and $o^1$ by a spring $p$ that is connected at its lower end to a lug $g^1$ on the vertical key-bar $g$ and at its upper end to a fixed plate $r$ common to all the springs $p$. There is also a spacing key $s$ carried by arms $s$ (Figs. 2 and 3) and also a combination key $m'$ and lever $m^2$ for leaving out a space between two letters to form joined letters. The several combination bars $d$, space bars $e$ and combined horizontal and vertical key bars $f—g$ are each made of thin sheet metal. Below the set of vertical key bars $g$ and arranged to be depressed by any one of them, is a trip key bar $t$ of angular section carried by the inner arms $u$ of a pair of levers $u$ $u^1$ fixed to a trip shaft $v$ arranged at the front of the perforator and the function of which is hereinafter described. The spacing key lever arms $s^1$ are pivoted at $s^2$ and controlled by springs $s^3$ and have their inner arms $s^4$ located below the arms $u^1$ of the levers $u$ $u^1$. Below the trip key bar $t$ and the lever arms $u$ there may be stops $w$. Adjustable buffer stops $x$ are provided for the arms $s^4$ of the spacing key levers $s^1$ $s^4$ and levers $u$ $u^1$. Associated with the combination bars $d$ and space bars $e$ and at the right hand side of the perforator, is a transverse resetting bar 1 that is common to all the combination and space bars and is made in the form of a plate pivoted at its lower end. The combination bars $d$, which are free to slide, are normally held in their extreme forward position by the said resetting bar 1. The space bars $e$ are each connected to a spring $e^1$ that will normally move it towards the resetting bar which serves as a stop therefor. The resetting bar 1 is connected by a rod 2 to a lever arm 3 arranged to be operated at the required times by a cam 4, hereinafter called for distinction the resetting cam. At the left hand end of the combination bars $d$ is a punch block 5 formed with twenty holes arranged in two sets of ten each, one above the other (Fig. 8), the pitch of the holes, both horizontally and vertically, and the diameters of the holes, corresponding to the pitch in the same direction and the diameters of the holes to be punched in a tape to form letters according to the Wheatstone-Morse system. Fitted in each hole in the punch block 5 is a punch 6 the right hand end of which extends from the block, is formed with a part $6^a$ of reduced diameter terminating in a head or flange $6^b$ (Figs. 1 and 9) and is engaged by a stationary punch withdrawing plate 7 common to all the punches. Fixed to the opposite or left hand side of the punch block 5 is a thin die plate 9 having holes therein corresponding in number, pitch, diameter and arrangement to the punch holes in the punch block 5. Formed in the left hand side of this die plate is a lateral vertical guideway 8 for the tape. Fixed sideways to the punch block and covering the die plate 9 and guideway 8 is a die back plate 10 having clearing holes for the free passage of the cuttings made by the punches. Fixed to the opposite side of the punch block 5 is a plate 11 having holes therein similar to those in the punch block. The tape guideway 8 is extended towards the front of the perforator in a forward extension 10ª of the back plate 10. One side wall 10ᵇ of the guideway in the forward extension 10ª may be of glass. The punch block is suitably supported, as by a spring blade 12, so that it can be moved horizontally to the right and left towards and from the combination bars *d*. The left hand ends *d*¹ of these bars are reduced in depth and bent so that each adjacent pair are arranged one above the other and opposite the ends of a corresponding pair of punches 6 which are also one above the other. The punch block 5 is provided with a lateral extension 13 by which it is connected to a pivoted lever arm 14 that is oscillated by a cam 15, hereinafter called for distinction the punch block cam.

At the left end of the space bars *e* is a space stop bracket 16 (Figs. 10, 11 and 12) carried by a parallel motion arrangement 17 so that it can be moved horizontally by hand, against the action of a spring 18 away from the space bars *e* and the forward extension 10ª of the back die plate 10 and, when released, be firmly held by the said spring in its normal position. The space-stop bracket 16 (Figs. 10, 11 and 12) is formed with two transverse grooves 19, 19ª and on one side with ten vertical grooves 20 that extend across the transverse groove 19. Into these vertical grooves 20 but not across the transverse groove 19 normally extend the left hand portions of ten ⌐ or channeled shaped plates 21 (hereinafter called for distinction space stops) the right hand end portions of which are fixed to the left hand ends of the respective space bars *e*. Into the said transverse grooves 19, 19ª extends the vertical portions 22, 22ª of a bent piece of sheet metal (Figs. 13, 14 and 15) the horizontal portion 22* of which is arranged to move over the upper surface of the portion of the space stop bracket 16 that is at the right hand side of the transverse groove 19ª in the said bracket and is provided with a number of small horizontal pins 22ᵇ, say four, the diameter and pitch of which corresponds with the diameter and pitch of the central row of feed holes in the tape to be punched. The piece of metal 22—22ª with the pins 22ᵇ is herein called the feed rake and is used to feed punched tape in a forward direction through the tape guideway 8. The pins of this feed rake are so arranged that they extend through a transversely extending slot 10ᵇ formed in the adjacent side of the forward extension 10ª of the back die plate 10 and along which they can reciprocate. The arrangement is such that when the punch block 5 with die plates 9, 10, 11 and forward extension 10ª is moved to the left and away from the combination bars *d*, to effect the removal of the punches 6 from the tape after punching a set of holes therein to represent a letter, the pins 22ᵇ of the feed rake will enter some of the central feed holes in the punched tape and when the punch block is afterwards moved to the right, the pins will leave the feed holes in the tape.

The feed holes in the tape are preferably previously made in a separate machine, but they may be made in the key-board perforator by providing this machine, as shown in Fig. 1, with a row of feed punches 23 with corresponding holes in the die plate 9, and die back plate 10. The feed hole punches 23 would be fixed in the punch withdrawing plate 7 and extend through holes in the punch block as shown.

The feed rake 22—22ᵇ is caused to make its rearward stroke by the action of a spacing lever 24 in the form of a spring blade that is connected to it by a pin and slot connection at 25. It is adapted to be arrested by any one of the space stops 21 that is allowed to extend across the transverse groove 19 and into the path of the vertical portion 22 of the feed rake. The said feed rake is afterwards moved forward to a definite position, limited by a fixed stop 26, by the spacing lever 24 which is positively operated in the forward direction by another cam 27 (hereinafter called for distinction the spacing cam). To enable this variable backward movement of the feed rake to take place, the spacing lever 24 may be pivoted to the fulcrum pin 28 of a bell crank lever 29—29ª, one arm 29 of which bears against the spacing lever 24 and the other end 29ª of which is connected by a link 30, to one portion 31 of a vertical oscillating lever adapted to be oscillated by a cam hereinafter called the spacing cam 27. The spacing lever 24 is held against the adjacent arm 28 of the bell crank lever 29—29ª by a spring, for instance a coiled spring 32, that causes it to make its inward movement when the bell crank lever 29—29ª is moved in one direction by the spacing cam 27 but will yield to allow the said spacing lever 24 and the feed rake 22, 22ª, 22ᵇ to be arrested by any one of the space stops 21 extending across the transverse groove 19 in the space stop bracket, the said arm of the bell crank lever then completing its stroke independently of the spacing lever. When the bell crank lever makes its return or forward stroke, it will come into contact with the spacing lever and positively move it forward to a definite extent so as to move the feed rake to a definite forward position against the stop 26.

The three cams 4, 15 and 27 for respectively operating the resetting bar 1, the punch block 5 and the parts carried thereby and the feed rake 22, 22ª, 22ᵇ may conveniently be constituted, as shown, by separate cam grooves of suitable shape cut in a hollow cam shaft 33 (Fig. 17) carried by and surrounding a driving shaft 34 but normally disconnected therefrom, the cams operating the resetting bar, punch block and feed rake, through the levers 3, 14 and 31—31ª respectively, provided with rollers engaging the cam grooves, and connecting links or equivalent hereinbefore described.

Variously constructed means may be employed for connecting the cam shaft 33 to the driving shaft 34 at the required times under the control of the trip shaft $v$ which is adapted to be actuated each time a key finger lever $m$, or the space key, is depressed. According to the particular arrangement for this purpose shown in the accompanying drawings, there is pivoted to the cam shaft 33, a pawl 35 adapted to be engaged with a ratchet wheel 36 (Fig. 5) fixed on the driving shaft 34 which is constantly rotated when the perforator is in use, as by a belt driven pulley 37. The pawl 35 is normally held out of engagement with the ratchet wheel, against the action of a spring 38, by a two armed pivoted pawl abutment 39, 39ª one arm 39 of which normally engages, under the action of a spring 40, a lever arm or extension 35ª on the pawl and the other arm 39ª of which is adapted normally to rest upon a stop 39ᵇ and to be acted upon by a shoulder 41ª on a pawl trip device 41. The pawl 35 is provided with another extension 35ᵇ adapted to bear against an abutment 33ª on the cam shaft 33 to limit the turning movement of the pawl when the pawl is disengaged from the ratchet wheel 36. The pawl trip device 41 consists of a strip of metal supported and guided by the said arm 39ª and pivoted at its lower end to one arm 42 of a pawl trip lever fixed to the aforesaid trip shaft $v$ and the other arm 42ª of which is connected to an adjustable spring 43. The pawl trip device 41 is held laterally against a cam 44 on the cam shaft 33 by a spring 45. The arrangement is such that upon the operation of a key, the trip shaft $v$ and pawl trip lever 42—42ª are momentarily turned to a sufficient extent to cause the shoulder 41ª on the pawl trip device 41 to rise and turn the pawl abutment 39, 39ª and release the pawl 35 and then, by the action of the cam 44 to move the trip device 41 laterally to detach the shoulder 41ª thereon from the arm 39ª of the pawl abutment 39, 39ª and permit this abutment immediately to return to its original operative position under the action of its spring 45. The pawl 35 when released, is moved by its spring 38 into engagement with the rotary ratchet wheel 36 whereby it and the attached cam shaft 33 are caused to make one revolution whereupon the arm or extension 35ª of the pawl again comes into contact with the arm 39 of the pawl abutment 39, 39ª and is partly turned thereby so as to disengage the pawl from the ratchet wheel 36 and stop the cam shaft, the extension 35ᵇ on the pawl then bearing against the abutment 33ª on the cam shaft 33. The cam shaft is then prevented from turning backwards, under the influence of the pawl spring 38, by any suitable means, as for instance a spring controlled detent 46 pivoted to the framework $b$ of the machine.

The operation of the perforator is as follows:—Normally, when the machine is at rest with the driving shaft 34 running and a tape in the tape guideway 8, the resetting bar will hold the combination bars $d$ and space bar $e$ in their extreme left hand positions (Fig. 1) with the left hand bent ends of the ten pairs of combination bars $d$ arranged opposite and near to the ten pairs of punches 6 and the space stops 21 connected to the left hand ends of the ten space bars $e$ held away from the transverse groove 19 in the space stop bracket 16. Upon depressing any one of the key levers $m$, the corresponding horizontal key bar $f$ will descend, so as to engage and hold against endways motion, the combination bars $d$ corresponding to the letter to be punched in the tape and also all the space bars $e$ except the one corresponding to the said letter to be punched in the tape. The depression of the key lever $m$ also causes, through the downward movement of the corresponding vertical key bar $g$, trip key bar $t$ and lever arm $u$, partial rotary motion of the trip shaft $v$, upward movement of the pawl trip device 41 and turning movement of the pawl abutment 39—39ª, the release of the said pawl 35 so as to permit it to clutch the cam shaft 33 to the rotating driving shaft 34. The resetting cam 4 then moves the resetting bar 1 to its inoperative right hand position and leaves the combination bars $d$ not concerned in the letter to be punched in the tape, free to be moved into their right hand inoperative positions. At the same time, the space bar $e$ corresponding to the letter, is freed and moves to the right under the action of its spring, bringing its left hand extension or space stop 21 across the transverse groove 19 in the space stop bracket 16. The other space bars are held by the horizontal key bar $f$ in their left hand or inoperative position. The punch block cam 15 at the same time moves the punch block 5 towards the combination bars held by the horizontal key bar $f$ so as to bring the corresponding punches against the ends of such combination bars and cause them to punch the tape which is forced against them by the movement of the punch block. The remaining free combination bars $d$ are moved idly back to the right by the tape, so as to be inoperative thereon. By reason of such movement of the punch block, the feed rake 22, 22ª, 22ᵇ is disengaged from the tape and is thereupon moved backwards by the spacing lever 24, under the control of the spacing cam 27, which is then in action, until it is arrested by the extension or space stop 21 of the space bar e extending across the transverse groove 19 in the space stop bracket 16. The punch block 5 is then moved to the left by the punch-block cam 15 to withdraw the tape from the punches 6, which are prevented from following the block by the punch withdrawing plate y, and the punched tape is thereby re-engaged with the feed rake which is then positively moved by the spacing lever 24 and spacing cam 27 into its forward position against the stop 26, so as to bring the succeeding portion of the tape into a position to be punched to represent a succeeding letter, on again depressing a key lever. At the end of the return movement of the punch block 5 and forward movement of the feed rake, the resetting bar 1 will be returned by the action of the resetting cam 4 to its original position and thereby return the displaced combination bars d and space bar e to their original positions in readiness for the next operation of the perforator. At the completion of the above operations, the pawl 35 and cam shaft 33 having made one complete revolution, will then become disengaged from the driving shaft by the pawl abutment 29, 29$^a$ and come to rest, and be held as described.

When the spacing key s is depressed, the arms s$^4$ of its levers s$^1$ s$^4$ will act against and raise the arms u$^1$ of the levers u u$^1$ fixed to the trip shaft v and partly rotate such shaft against the action of the spring 43 so that the above described operations will again take place, except that as none of the combination bars d or space bars e will be held stationary by the key bars f no punching operation will take place and the feed rake will only be moved to a sufficient extent to move the tape forward to an amount corresponding to a space.

When a combination finger key lever m$^2$ (Fig. 2) is provided, as will usually be the case it is jointed to one arm 47 of a bell crank lever (Fig. 4) the other arm 47$^a$ of which is connected through a spring 48 to a supplementary notched space stop 21$^a$ arranged adjacent to the forward stop 26 for the feed rake and the left hand end of which normally extends into a supplementary vertical groove 20$^a$ (Figs. 11 and 12) in the space stop bracket 16 but not into the transverse groove 19. The arrangement is such that when the combination key m$^1$ is depressed, the bell crank lever 47, 47$^a$ will act to move the supplementary space stop 21$^a$ to the right when it will bear laterally against the feed rake which is then in its forward position bearing against its forward stop 16. When the next ordinary key lever m is operated, the feed rake will be moved backward and the supplementary space stop 21$^a$ will enter the transverse groove 19 so that when the feed rake is next moved forward, its travel will be reduced by the supplementary space stop to an extent corresponding to the distance between two feed holes in the tape. As a result there will be no space between the letter just finished and the following letter.

The perforator hereinbefore described could be used for punching tape according to the five unit system. In this case, only five of the combination bars d would be used, the remainder being removed if desired. Also, the space bars e and space stops 21 would be removed and a stop fixed in one of the grooves 20 in the space stop bracket 16 in such a position as to positively limit the backward movement of the feed rake to the desired extent.

For punching tape according to the five unit system, it is however preferred to use the modified construction of keyboard perforator shown in Figs. 20 and 21. In this case the perforator is constructed to accommodate only five combination bars d, and the punch block 5 to accommodate five punches, the die plates being made to suit. Or, if an intermediate row of feed holes is to be punched in the tape, there may be six combination bars d, as shown, and six punches in the punch block, the die plate 9 (Fig. 22) being then formed with six apertures to suit. In this case, the tape guideway 8 in the die plate 9 is preferably arranged vertically as shown, and the perforated tape fed upward at each operation of the machine, by a feed wheel 50. This feed wheel may be operated at the required times by a pawl 51 engaging a toothed wheel 52 connected to the feed wheel and oscillated by a lever 53 and a link 53$^a$ from arm 3$^a$ on the lever 3 connected to the rod 2 for moving the resetting bar 1 (Figs. 1 and 2) into its operative position and actuated by the resetting cam 4.

As the tape feeding mechanism used in the perforator shown in Figs. 2 and 4, including its operating cam 27, is dispensed with, as well as the space bars e and space stops 21, the construction of the perforator for punching tape on the five unit system is much simpler than that for punching tape on the Wheatstone-Morse system. In other respects the construction and operation of the perforator is similar to that of the perforator hereinbefore described with reference to and shown in Figs. 1 to 5 inclusive.

The details of construction, and the various operating means used, can be variously modified without departing from the essential features of the invention.

What I claim is:—

1. A keyboard perforator for punching perforations in a tape to represent letters, comprising a movable punch block, a die carried thereby and having a tape guideway therein, punches carried by and movable endways in said block and die, a stationary punch withdrawing device, a series of endways movable specially notched combination bars arranged in the paths of said punches, a resetting device adapted to move said combination bars into their forward operative positions, a series of keys, a series of key operated devices adapted to hold endways those combination bars that correspond to the letters to be punched, tape feeding mechanism adapted to feed punched tape forward to a definite position after each punching or spacing operation, means adapted to move said resetting device into its operative and inoperative positions, means adapted to move said punch block towards and from said combination bars, means adapted to actuate said tape feeding mechanism, and controlling means adapted to control the operation of the means used respectively for operating the resetting device, punch block and tape feeding mechanism, said controlling means being arranged to be brought into operation at each operation of one of said key operated devices, or the spacing key, and to be put out of operation automatically after the set of punching, tape feeding and bar resetting operations for producing a punched letter in the tape, or for forming a space on the tape, has been completed.

2. A key board perforator according to claim 1, wherein the tape feeding mechanism comprises a toothed device adapted to engage said tape and means for moving said toothed device and tape forward after each punching and spacing operation.

3. A key board perforator according to claim 1, wherein the tape feeding mechanism comprises a toothed device arranged to reciprocate and to become disengaged from the tape during each punching operation and re-engaged with the tape after the latter has been released from the punches, means for causing said toothed device to move backward idly, after being released from the tape, to an extent corresponding to the length of the latter being punched in the tape, or of a space being left on the tape, and means for moving said toothed device forward to a definite position after being re-engaged with the tape, for the purpose set forth.

4. A key board perforator according to claim 1, wherein the tape feeding mechanism comprises a stationary support, a rake arranged to reciprocate on said support and become disengaged from the tape during each punching operation and re-engaged with the tape after the latter has been released from the punches, a stop, a spring controlled spacing lever connected to said rake and cam actuated means adapted, when moved in one direction, to permit said spacing lever and rake to move backward idly, when the rake is released from the tape, to an extent corresponding to the length of the letter being punched in the tape, or of the space being left on the tape, and when moved in the opposite direction, positively to move said spacing lever and rake forward against said stop after the rake has been re-engaged with said tape.

5. A key-board perforator according to claim 1, wherein the specially notched combination bars are arranged directly between the key operated devices controlling them and the punches.

6. A key board perforator for punching perforations in a tape to represent letters and to form spaces on the tape between letters, comprising a movable punch block, a die carried by said block and punches endways movable in said block and die, the number and arrangement of the punches and of the holes in said punch block and die corresponding to the perforations in the longest letter in Wheatstone-Morse punched tape, a series of endways movable combination bars arranged in line with said punches, a toothed feeding device adapted to be engaged with and disengaged from a portion of the tape that has been perforated, a stationary support for said feeding device, means for reciprocating said feeding device and a stop for limiting the forward movement of said device, a series of space bars each carrying a space stop, spring means adapted to move said space bars endways and bring the space stops carried thereby into the path of said feeding device, a resetting device adapted to move the combination bars into their forward operative positions in relation to the punch block and punches and to move the space bars and space stops into their forward inoperative positions against the action of their spring-controlling means, a series of key operated devices corresponding to the letters to be punched in the tape and each adapted, when operated, to hold the combination bars, corresponding to the letter to be punched, in their operative position and also to enable the space bar corresponding to the said letter to move into its operative position and hold its space stop in the path of said toothed feeding device, means adapted to operate said resetting device at the required times, means adapted to move said punch block with die and punches towards and from said combination bars, punch withdrawing means adapted to disengage the punches from punched tape and means adapted to move said toothed feeding device backward idly during punching of the tape and afterwards to move the punched tape forward until arrested by said stop.

7. A key board perforator according to claim 1, wherein the means used for operating the bar resetting means, punch block, and tape feeding mechanism at the required times, comprises rotary cams adapted to be brought into operation at each operation of one of said key operated devices and to be put out of operation automatically after the set of bar resetting, punching and tape feeding operations have been completed.

8. A key board perforator according to claim 6, wherein the space bars are arranged directly between the key operated devices and tape feeding device.

9. A key board perforator according to claim 1, wherein the notched combination bars are arranged parallel to one another and the key operated devices for controlling their endways motion are arranged above and at right angles to the said bars.

10. A key board perforator according to claim 6, wherein the notched combination bars and space bars are arranged parallel to one another in two sets and the key operated devices for controlling their endways motion are arranged transversely above and at right angles to them.

11. In a key board perforator according to claim 1, the combination with the movable punch block, tape feeding mechanism and bar resetting device of a constantly rotating shaft, a sleeve free on said shaft, a resetting cam, a punch block cam and a spacing cam carried by said sleeve and adapted respectively to operate the bar resetting device, the punch block and tape feeding mechanism, a clutch device adapted normally to disengage said sleeve from said shaft, means acting normally to hold the clutch device in its open position, and trip mechanism adapted at each operation of a key operated device, or the spacing key, to trip said holding means to release the clutch device and enable it to connect said sleeve to said shaft and permit said sleeve to make one revolution and then to open the clutch device to disengage the sleeve from the shaft.

12. A key board perforator, comprising a combined punch block, a die plate with tape guideway and a perforated die back plate having a forward extension with tape guideway therein and a lateral slot, punches endways movable in said block, a stationary punch withdrawing device adapted to withdraw the punches from punched tape, notched combination bars arranged in line with the respective punches, means for moving said bars forward, means for holding these bars in position that are to be used in the punching of a letter in a tape, means for moving said punch block and attached parts and from said bars at each operation of the perforator, a stationary support, a stop, a feed rake carried by said support and arranged to reciprocate in the slot in the said die back plate extension and to become engaged with and disengaged from the tape therein by the to and fro motion of the punch block and means for reciprocating said feed rake.

13. A key board perforator, comprising a movable punch block with die plate and tape guideway, punches in said block, stationary punch withdrawing means, notched combination bars in line with said punches, a bar resetting device, a series of key operated bar holding devices, a spacing lever, tape feeding mechanism, a rotary sleeve, a set of cams thereon adapted to operate said bar resetting device, punch block with associated parts and said tape feeding mechanism, a shaft designed constantly to rotate when the key board perforator is in use and on which said sleeve with cams is normally held stationary, a toothed wheel fast on said shaft, a pawl pivoted on said sleeve and adapted to engage said toothed wheel, a spring controlled trip device normally holding said pawl out of gear with said toothed wheel, a spring controlled trip bar adapted first to move said trip device out of contact with said pawl and permit the latter to engage said toothed wheel and then to release said trip device and permit it automatically to move into position to move the pawl out of gear with said toothed wheel when it and the attached sleeve and cams have made one revolution, and means adapted to move said trip bar to actuate said pawl tripping device each time a key operated bar holding device, or said spacing lever, is operated.

14. In a key board perforator, the combination with tape punching means and tape feeding mechanism comprising a toothed feed device adapted to engage tape and feed it forward, of a stationary support on which said feed device can be reciprocated by said feeding mechanism, a stop at the forward part of said support for limiting forward motion of the feed device, a supplemental space stop adapted to be moved into position behind said forward stop to limit forward movement of said feed device, a combination finger key lever and means whereby said supplementary space stop can be brought into the operative position by actuation of said finger key lever.

15. In a key board perforator, the combination with a movable punch block with die plate, tape guideway and punches endways movable in said punch block and a series of specially notched combination bars arranged side by side and having their forward ends in line with the punches, of a series of parallel key bars having horizontal portions extending transversely over said combination bars and vertically extending portions, spring means for normally holding said key bars out of engagement with said combination bars and finger key levers whereby said key bars can be moved into their operative positions.

16. In a key board perforator, the combination with a movable punch block with die plate and tape guideway, punches in said blocks, means for selecting and holding punches endways in position and means for moving said punch block towards said punches and punch selecting and holding means, of a toothed tape feeding device and means for actuating said tape feeding device and moving the tape forward to a definite position after each tape punching operation.

Signed at New York, county and State of New York, U. S. A., this twenty-sixth day of June, 1922.

FREDERICK GEORGE CREED.